United States Patent
Taylor

(10) Patent No.: US 6,321,768 B1
(45) Date of Patent: Nov. 27, 2001

(54) FLUID FLOW SHUTDOWN AND PRESSURE RELIEF VALVE WITH A FUSABLE ELEMENT

(76) Inventor: Julian S. Taylor, 8300 SW. 8th St., Oklahoma City, OK (US) 73128

(*) Notice: Subject to any disclaimer, the term of this patent is extended or adjusted under 35 U.S.C. 154(b) by 0 days.

(21) Appl. No.: 09/690,028

(22) Filed: Oct. 16, 2000

(51) Int. Cl.⁷ ................................................. F16K 17/40
(52) U.S. Cl. ..................... 137/68.12; 137/73; 137/80; 169/57; 169/58; 239/75
(58) Field of Search .................... 137/67, 68.12, 137/70, 72, 73, 75, 79, 80; 169/42, 57, 58; 239/75

(56) References Cited

U.S. PATENT DOCUMENTS

| | | | |
|---|---|---|---|
| 3,338,255 | * | 8/1967 | Exline et al. ...................... 137/68.12 |
| 3,489,160 | * | 1/1970 | Moore ............................... 137/68.12 |
| 3,734,114 | * | 5/1973 | Phillips ............................. 137/68.12 |
| 4,896,690 | * | 1/1990 | Taylor ..................................... 137/73 |

FOREIGN PATENT DOCUMENTS

000769009 * 2/1957 (GB) ................................ 137/68.12

* cited by examiner

Primary Examiner—Michael Powell Buiz
Assistant Examiner—Ramesh Krishnamurthy
(74) Attorney, Agent, or Firm—Robert K. Rhea

(57) ABSTRACT

A fluid pressure and heat sensitive flow control valve interposed in a flow line includes a collapsible pin, normally maintaining the valve open, which collapses to close the valve in response to fluid pressure above a predetermined limit and includes a fusible plug which melts in event of a fire, releasing the pin to allow fluid pressure to close the valve.

8 Claims, 2 Drawing Sheets

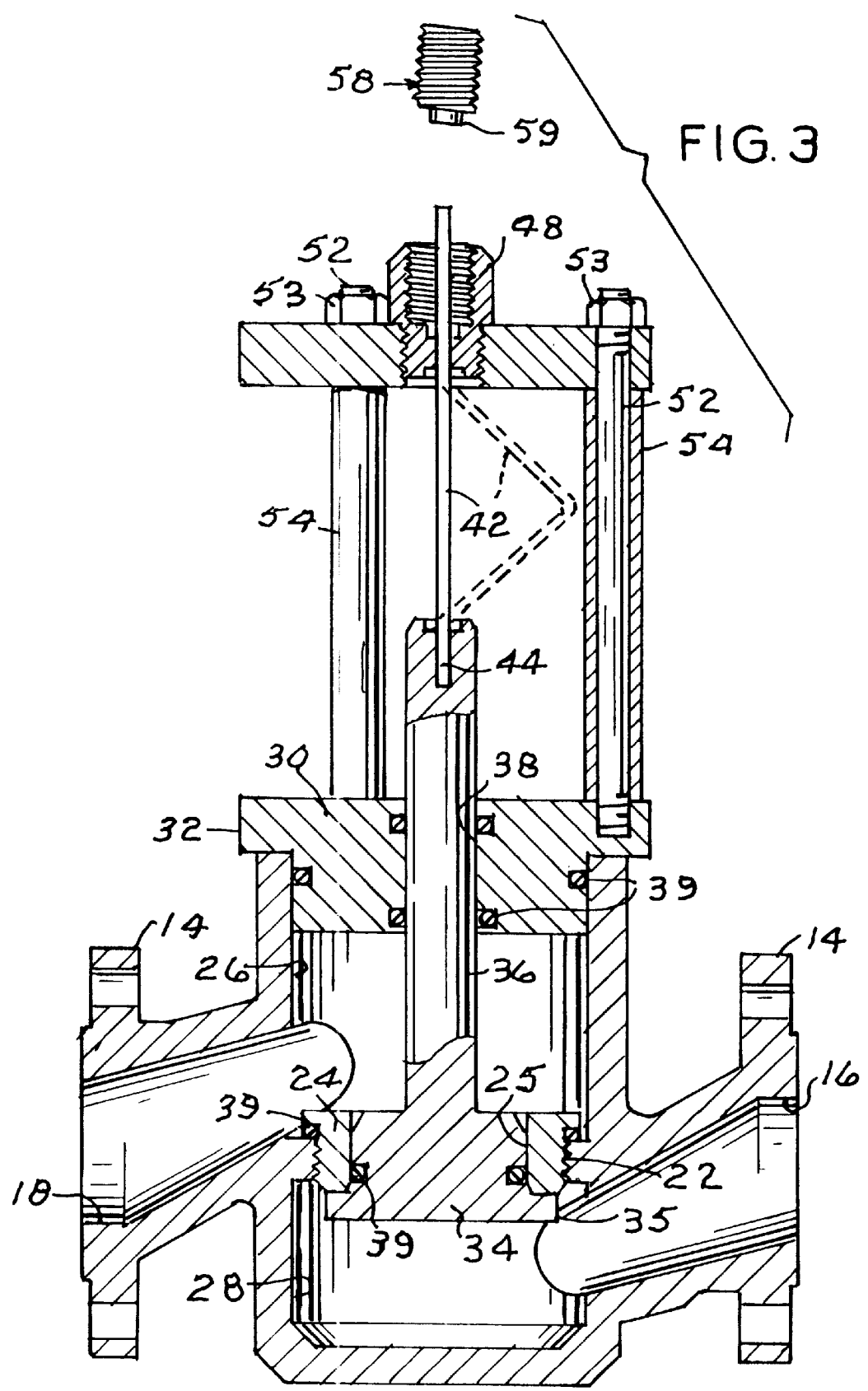

//FLUID FLOW SHUTDOWN AND PRESSURE RELIEF VALVE WITH A FUSABLE ELEMENT

CROSS REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

This invention relates to fluid control valves and more particularly to a high temperature fire hazard shutdown valve for interrupting fluid flow.

1. Field of the Invention

Relief valves or emergency shutdown valves for protecting equipment and piping under greater than a predetermined value for releasing or stopping the flow of fluid are well known. However, there is a need for a heat responsive valve to be interposed in a fluid conducting line which is responsive to excessive heat such as, heat generated by a fire in which a heat responsive element forms a fuse for moving a valve from an open fluid flow position to a closed position or vice versa.

2. Description of the Prior Art

The prior art generally reveals a plurality of heat responsive valves, commonly referred to as sprinkler valve heads, which are connected with a fluid fire retardant, usually water, which is released to control the fire in response to a predetermined temperature melting a fusible link maintaining the sprinkler head in valve closed position which when melted by excessive heat allows fluid to be sprayed into a predetermined area for controlling fires.

This invention provides a valve which controls the flow of fluid by allowing fluid flow therethrough in which a heat fusible plug maintains a pressure responsive collapsible pin relief valve monitoring fluid flowing through the valve and interrupts the flow by collapse of the pin in response to excessive fluid pressure with the additional feature of the heat fusible plug melting as a result of a fire and releasing one end portion of the pressure responsive collapsible pin, thus allowing fluid pressure to close the valve flow passageway.

I am not aware of any prior art valve disclosing this fluid pressure responsive, fusible plug type emergency shut-down valve.

BRIEF SUMMARY OF THE INVENTION

A valve body having spaced-apart bolt flanges for inline connection with a pipeline is provided with a flow passageway between the bolt flange ends. A transverse bore, open to one side of the body, intersects the fluid passageway and forms a shoulder for receiving a sleeve-like valve seat mating and sealing with a piston type valve, having a piston rod slideably projecting axially outward of a central bore in a bonnet head. A pressure responsive collapsible pin projects axially outward from the end of the piston rod, opposite the piston and is slideably received by a bore in a plate parallel with the valve bonnet and supported in spaced relation there-with by a plurality of bolts forming a cage means 40. Sleeves surrounding the posts maintain the plate in spaced relation with the bonnet head and an axial threaded bore in the plate receives a plate bushing having an axial bore slideably surrounding the other end portion of the collapsible pin. An axial opening in the plate bushing opposite the collapsible pin is filled with a heat fusible alloy, such as babbitt.

The principal object of this invention is to provide a fluid pressure control emergency shutdown or relief valve having a fuse plug maintaining a pressure responsive collapsible pin holding a valve in a seated or unseated position which further includes a heat fusible plug which releases one end portion of the collapsible pin in response to a predetermined temperature for sliding movement outwardly of the valve and allowing a valve to seat or unseat for permitting or stopping fluid flow through the valve.

DETAILED DESCRIPTION OF THE INVENTION

Figure 1:
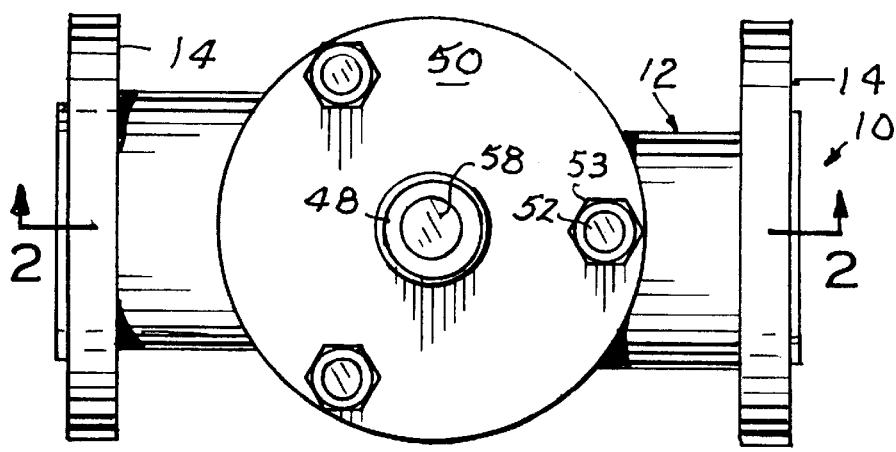
FIG. 1 is a top view.

The reference numeral 10 indicates the valve as a whole comprising a valve body 12 having bolt flange ends 14 adapted to be interposed in a fluid conductor, not shown.

The bolt flange ends 14 are provided with inlet and outlet ports 16 and 18, respectively, forming a fluid passageway 20 through the valve.

A partition transversely intersects the fluid passageway and is centrally bored and threaded as at 22 forming a valve seat shoulder for receiving a valve seat body 24 having a central opening forming a cylindrical valve seat 25. The valve body is counterbored on opposite sides of the valve seat, as at 26 and 28. The inlet and outlet port bores being respectively angled toward the innermost end of the counterbore 28 and the downstream side of the valve seat 24. The counterbore 26 is closed by a centrally bored valve bonnet 30 having a flanged end 32 opposite the valve seat.

Valve means such as a piston valve 34 having a diameter cooperatively received slideably by the valve seat sealing surface 25 and having a flanged end 35 opposite a stem or piston rod 36 is axially disposed in the valve counterbores 26 and 28 with the rod 36 slideably projecting through the central bore 38 of the valve bonnet. The piston valve 34 is normally maintained off seat and the fluid passageway 20 open by a collapsible pin in a cage means 40 connected with the valve body bonnet.

O-rings 39 seal the valve seat 24 and bonnet 30 with the body 12 and the piston 34 and piston rod 36 with the valve seat 24 and bonnet 30, respectively.

The pin cage means 40 comprises a collapsible pin 42 having one end portion supported in a socket 44 in the end of the piston rod 36 projecting outwardly of the valve bonnet 30. The other end of the collapsible pin is nested by a central bore 46 in a plate bushing 48 threadedly received axially by a plate 50 maintained in spaced relation with the valve bonnet flange 32 by plurality three (3), in the example shown, of posts 52 and nuts 53 and secured at one end to the valve bonnet flange 32 with a like plurality of sleeve spacers 54 around the posts interposed between the valve bonnet and the plate 50.

The bushing 48 is similarly centrally bored and threaded, as at 56, communicating with the bore 46 containing the end portion of the collapsible pin 42. The bore 56 cooperatively receives a fusible plug 58 formed from a relatively low temperature melting point alloy, such as babbitt, for the purpose presently explained.

The plug 58 may be poured, as molten metal into the threaded bore 56 or formed in a separate mold and screwed into the bore 56. In either event the cooperating threads, on the inner periphery of the bore 56 and periphery of the plug 58 are believed necessary to insure a positive contact between the plug 58 and bore 56 sufficient to form a stop with a hard metal disc embedded in the plug and interposed between the plug and adjacent end of the pin 42 and initially fail in response to heat approaching the melting point of the plug 58 periphery thus allowing fluid pressure to move the piston 34 and close the fluid passageway and simultaneously eject the plug 58 by the adjacent end portion of the pin 42 sliding through the bore 46.

OPERATION

In operation, assuming the valve 10 has been assembled and installed as described in a fluid conductor. In the position illustrated by FIG. 2, the collapsible pin 42 maintains the piston valve 34 in flow passageway open position with fluid under pressure flowing through the valve 10. In the event of a fire and heat approaching the melting point of the fusible plug 58 the plug threads at least partially melt and the fluid pressure moves the pin 42 and the piston valve 34 to a seated position with the valve seat 24 (FIG. 3) thus closing the fluid passageway and shutting down the fluid system controlled by the valve.

Figure 2:
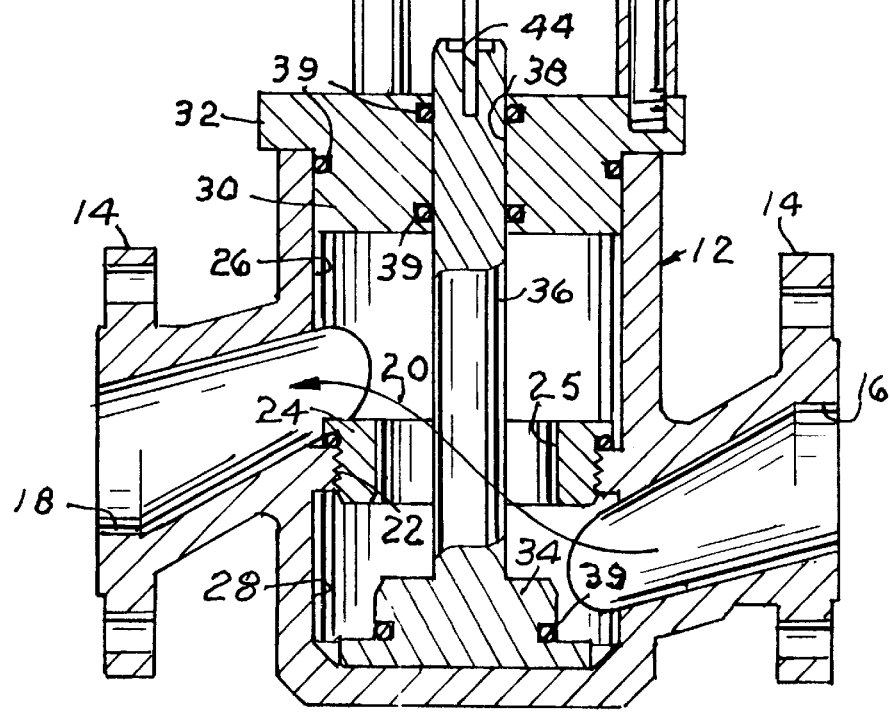
FIG. 2 is a vertical cross sectional view taken substantially along the line 2—2 of FIG. 1, illustrating the valve in open position; and, FIG. 3 is a view similar to FIG. 2, illustrating the valve in closed position.

The valve may be placed back in operation by manually moving the piston 34 to its fluid passageway open position, and positioning the collapsible pin 42, in the position illustrated by FIG. 2. Installing a new fusible plug 58, not shown, in the threaded socket 56 of the plate bushing 48 and thereafter allowing fluid flow through the passageway 20.

A second feature of the valve is monitoring excess fluid pressure by the collapsible pin 42. In the event the fluid flowing through the passageway 20 reaches a predetermined value, fluid pressure moves the piston toward its seat collapsing the pin 42 to the dotted line position of FIG. 3, thus closing the valve and shutting down the fluid system. After the excess pressure problem has been corrected the collapsible pin may be replaced by installing a new pin 42, not shown, after removing the collapsed pin by unscrewing the plate bushing 48 from the plate 50, placing the replacement collapsible pin in the piston rod socket rod 44 and replacing the plate bushing 48 so its socket 46 surrounds the other end portion of the new collapsible pin.

Obviously the invention is susceptible to changes or alterations without defeating its practicability. Therefore, I do not wish to be confined to the preferred embodiment(s) shown in the drawing(s) and described herein.

I claim:

1. A fluid pressure and heat sensitive control valve, comprising:

a valve assembly including a valve body having inline inlet and outlet ports forming a fluid passageway adapted to be interposed in a flow line;

a valve seat interposed in the passageway;

normally open piston valve means including a piston valve for sealing with said valve seat and closing the fluid passageway and having a piston rod slidably projecting outwardly of the valve body;

axially collapsible pin means including a collapsible pin having a first end in axial contact with the outwardly projecting portion of said piston rod for normally biasing said valve means toward a fluid passageway open position and releasing said valve means for sealing with said valve seat in response to fluid pressure above a predetermined value, said pin means including a plate supporting a fusible plug having a metal disc in axial contact with the end of said pin opposite said first end whereby, heat melting said plug releases the end of said pin opposite said first end allowing said piston valve to close the passageway.

2. The fluid control valve according to claim 1 and further including:

a bushing interposed between said plate and the fusible plug.

3. The fluid control valve according to claim 2 and further including:

said bushing having an inner periphery provided with cooperating screw threads or grooves forming contiguous contact of a periphery of said plug with the inner periphery of said bushing.

4. The fluid control valve according to claim 3 in which said plug is a metal alloy.

5. A fluid pressure and heat sensitive control valve, comprising:

a valve assembly including a valve body having inline inlet and outlet ports forming a fluid passageway adapted to be interposed in a fluid flow line;

a valve seat interposed in the passageway;

normally open valve means for sealing with said valve seat and closing the fluid passageway and having a valve stem end portion slidably projecting outwardly of the valve body;

axially collapsible pin means including a collapsible pin having a first end in axial contact with the outwardly projecting end portion of said valve stem for normally biasing said valve means toward a fluid passageway open position and releasing said valve means for sealing with said valve seat in response to fluid pressure above a predetermined value, said pin means including a plate supporting a fusible plug having a disc in axial contact with the end of said pin opposite said first end whereby, heat melting said plug releases the end of said pin opposite said first end allowing said piston valve to close the passageway.

6. The fluid control valve according to claim 5 and further including:

a bushing interposed between said plate and the fusible plug.

7. The fluid control valve according to claim 6 and further including:

said bushing having an inner periphery provided with cooperating screw threads or grooves in said bushing forming contiguous contact of a periphery of said plug with the inner periphery of said bushing.

8. The fluid control valve according to claim 7 in which said plug is a metal alloy.

* * * * *